(12) United States Patent
Lindbo et al.

(10) Patent No.: US 11,447,336 B2
(45) Date of Patent: Sep. 20, 2022

(54) ROBOTIC CARGO HANDLING SYSTEM AND METHOD

(71) Applicant: OCADO INNOVATION LIMITED, Hatfield (GB)

(72) Inventors: Lars Sverker Ture Lindbo, Hatfield (GB); Matthew Whelan, Hatfield (GB); Andrew John Ingram-Tedd, Hatfield (GB); Gion-Otto Presser-Velder, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 17/145,629

(22) Filed: Jan. 11, 2021

(65) Prior Publication Data

US 2021/0130089 A1 May 6, 2021

Related U.S. Application Data

(63) Continuation of application No. 16/312,033, filed as application No. PCT/EP2017/065234 on Jun. 21, 2017, now Pat. No. 10,919,698.

(30) Foreign Application Priority Data

Jun. 21, 2016 (GB) ..................................... 1610837

(51) Int. Cl.
*B65G 1/04* (2006.01)
*B65G 1/06* (2006.01)
*B65G 63/00* (2006.01)

(52) U.S. Cl.
CPC ......... *B65G 1/0464* (2013.01); *B65G 1/0492* (2013.01); *B65G 1/065* (2013.01); *B65G 63/004* (2013.01)

(58) Field of Classification Search
CPC .... B65G 1/065; B65G 1/0492; B65G 1/0464; B65G 63/004; H01L 21/67733
See application file for complete search history.

(56) References Cited

U.S. PATENT DOCUMENTS

| 6,572,319 B1 | 6/2003 | Simmons et al. |
| 7,287,953 B2 | 10/2007 | Schratt et al. |
(Continued)

FOREIGN PATENT DOCUMENTS

| CN | 1735547 A | 2/2006 |
| CN | 1980844 A | 6/2007 |
(Continued)

OTHER PUBLICATIONS

Examination Report dated Oct. 25, 2018, by the British Patent Office for Application No. 1709911.0.
(Continued)

*Primary Examiner* — Glenn F Myers
(74) *Attorney, Agent, or Firm* — Buchanan Ingersoll & Rooney PC

(57) ABSTRACT

A system and method for robotic container storage, handling, and transfer system and method includes a grid structure formed of two substantially perpendicular sets of rails above a portion of at least one transport network, a robotic load handling device operating on the grid structure, a vehicle means located on the at least one transport network below the grid structure configured to receive a container, the robotic load handling device being provided with an engaging means for engaging the container and a lifting means configured for lifting the container from the vehicle means for movement to an alternative location, wherein one or more portions of the rails above the vehicle means of the transport network are missing in a direction transverse to a direction of the transport network forming one or more open (Continued)

grid spaces enabling alignment of the robotic load handling device above the vehicle means.

20 Claims, 12 Drawing Sheets

(56) References Cited

U.S. PATENT DOCUMENTS

| | | | |
|---|---|---|---|
| 7,753,637 | B2 | 7/2010 | Benedict et al. |
| 8,206,074 | B2 | 6/2012 | Benedict et al. |
| 10,336,540 | B2 | 7/2019 | Gravelle et al. |
| 2005/0244254 | A1 | 11/2005 | Schratt et al. |
| 2007/0157878 | A1* | 7/2007 | Aoki ................ H01L 21/67733 118/500 |
| 2008/0213067 | A1 | 9/2008 | Jegers |
| 2008/0213073 | A1 | 9/2008 | Benedict et al. |
| 2010/0166530 | A1* | 7/2010 | Philp .................... B65G 63/065 414/343 |
| 2011/0027059 | A1 | 2/2011 | Benedict et al. |
| 2015/0127143 | A1 | 5/2015 | Lindbo et al. |
| 2016/0060037 | A1 | 3/2016 | Razumov |
| 2016/0276194 | A1* | 9/2016 | Wang ................ H01L 21/67766 |
| 2019/0375588 | A1 | 12/2019 | Lindbo et al. |

FOREIGN PATENT DOCUMENTS

| | | |
|---|---|---|
| CN | 101711210 A | 5/2010 |
| DE | 2629718 A1 | 1/1978 |
| DE | 4439740 C1 | 5/1996 |
| EP | 1037828 B1 | 9/2003 |
| GB | 2518259 A | 3/2015 |
| GB | 2520104 A | 5/2015 |
| GB | 2540651 A | 1/2017 |
| GB | 2541487 A | 2/2017 |
| WO | 2008108845 A3 | 11/2008 |
| WO | 2013167907 A1 | 11/2013 |
| WO | 2016166294 A1 | 10/2016 |
| WO | 2016166308 A1 | 10/2016 |

OTHER PUBLICATIONS

International Search Report (PCT/ISA/210) dated Sep. 21, 2017, by the European Patent Office as the International Searching Authority for International Application No. PCT/EP2017/065234.
Search and Examination Report dated Dec. 8, 2017, by the British Patent Office for Application No. 1709911.0.
Written Opinion (PCT/ISA/237) dated Sep. 21, 2017, by the European Patent Office as the International Searching Authority for International Application No. PCT/EP2017/065234.
First Office Action dated Jan. 12, 2021, by the Japanese Patent Office in corresponding Japanese Patent Application No. 2018-567221, and an English Translation of the Office Action. (8 pages).
First Office Action dated Mar. 19, 2020, by the Chinese Patent Office in corresponding Chinese Patent Application No. 201780049823.5, and an English Translation of the Office Action. (15 pages).
Office Action dated Mar. 29, 2021, by the Chinese Patent Office in corresponding Chinese Patent Application No. 201780049823.5, and an English Translation of the Office Action. (8 pages).
Search Report dated Dec. 22, 2016, by the Great Britain Patent Office in corresponding Great Britain Application No. GB1610837.5. (4 pages).
Second Office Action dated Oct. 26, 2020, by the Chinese Patent Office in corresponding Chinese Patent Application No. 201780049823.5, and an English Translation of the Office Action. (10 pages).
Final Office Action dated Aug. 24, 2021, by the Japanese Patent Office in corresponding Japanese Patent Application No. 2018-567221, and an English Translation of the Office Action. (4 pages).
Office Action (Examination Report No. 1) dated May 13, 2022, by the Australian Patent Office in corresponding Australian Patent Application No. 2017281303. (4 pages).
Office Action (Communication) dated Jul. 7, 2022, by the European Patent Office in corresponding European Patent Application No. 17 731 882.1. (4 pages).

* cited by examiner

404

ROBOTIC CARGO HANDLING SYSTEM AND METHOD

CROSS REFERENCE TO RELATED APPLICATIONS

This application is a continuation application of U.S. patent application Ser. No. 16/312,033 filed on Dec. 20, 2018, which is a U.S. National Stage application based on International Patent Application No. PCT/EP2017/065234 filed on Jun. 21, 2017, which claims priority to British Patent Application No. 1610837.5 filed on Jun. 21, 2016, the entire content of all three of which is incorporated herein by reference.

FIELD

The present invention relates to a robotic cargo handling system and method for the handling of trailers, semi-trailers and shipping containers by rail. More specifically but not exclusively, it relates to a cargo handling device and handling method in which cargo carrying containers may be moved from one cargo carrying means to a different cargo carrying means, or transferred from one mode of transport to another swiftly and efficiently.

BACKGROUND

Containers used for shipping goods, both internationally and domestically, typically take a number of forms, although the terminology used for these cargo carrying containers varies around the world. The term 'shipping container' is typically used to denote a large steel box that may be loaded on to different forms of transport such as road haulage equipment and also rail transport. The containers are typically shipped internationally via cargo vessels on to which the containers may be loaded and subsequently unloaded via large crane systems at purpose built container ports. UK Patent Publication No GB2540651 describes a system for storing such shipping containers at container ports and a method for moving shipping containers from ship to port and on to road or rail transport as required.

Some commercial and industrial activities require systems that enable the storage and retrieval of a large number of different products. One known type of system, for the storage and retrieval of items in multiple product lines involves arranging storage bins or containers in stacks on top of one another, the stacks being arranged in rows. The storage bins or containers are accessed from above by load handling devices travelling on a substantially horizontal grid located above the stacks of containers. The load handling devices lift containers out of the stacks and transport them to a required drop-off location.

The concept of using freestanding stacks of containers and providing a mechanism to retrieve and store specific containers has been developed further, for example as described in EP 1037828 B1 (Autostore), the contents of which are incorporated herein by reference. This describes a system in which stacks of containers are arranged within a frame structure. Robotic load handling devices can be controllably moved around the stack on a system of tracks on the upper most surface of the stack.

One development of load handling device is described UK Patent Publication No. GB2520104 (Ocado Innovation Limited) the contents of which are incorporated herein by reference. This describes a system where each robotic load handler only covers one grid space, thus allowing higher density of load handlers and thus higher throughput of a given size system. A system of this type is illustrated schematically in FIGS. 1 and 2 of the accompanying drawings.

In a further development the robotic load handlers could be scaled up to handle shipping containers, for instance in a port. This is described in patent application UK Patent Application No. GB2540651 the contents of which are incorporated herein by reference. Components of a system of this type is illustrated schematically in FIG. 3 of the accompanying drawings.

SUMMARY

According to the invention there is provided a robotic container storage, handling, and transfer system comprising a grid structure formed of two substantially perpendicular sets of rails above a portion of at least one transport network, at least one vehicle means located on the portion of the at least one transport network beneath the grid structure, the vehicle means being configured for delivering one or more containers to the grid, one or more of robotic load handling devices operating above and on the rails of the grid, the robotic load handling devices including: a body, a first set of wheels mounted to the body, the first set of wheels being arranged to engage with at least two rails of the first set of rails, and a second set of wheels mounted to the body, the second set of wheels being arranged to engage with at least two rails of the second set of rails, the first set of wheels being independently moveable and driveable with respect to the second set of wheels such that when in motion only one set of wheels is engaged with only one set of rails at any one time thereby enabling movement of the load handling device along the rails or tracks to any point on the grid by driving only the set of wheels engaged with the rails, an engaging means configured for engaging at least one of the one or more containers, and a lifting means configured for lifting the at least one of the one or more containers, wherein the one or more robotic load handling devices are configured to lift the one or more containers from the vehicle means and transfer the one or more containers to an alternative location, wherein a portion of the grid structure above the vehicle means of the at least one transport network has only one set of the rails such that the grid structure has missing sections, and the grid structure includes a protection means having a structure positioned above the portions of the grid with missing rails, the protection means being configured so as to prevent load handling devices from derailing.

According to the invention there is provided a robotic container storage, handling, and transfer system comprising a grid structure formed of two substantially perpendicular sets of rails above a portion of at least one transport network, a robotic load handling device operating on the grid structure, wherein the robotic load handling device includes a first set of wheels arranged to engage with at least two rails of the first set of rails, and a second set of wheels arranged to engage with at least two rails of the second set of rails, such that only one set of wheels is engaged with the grid structure at any one time, a vehicle means located on the at least one transport network below the grid structure, the vehicle means configured to receive a container, the load handling device being provided with an engaging means for engaging the container when located on the vehicle means, and a lifting means configured for lifting the container from the vehicle means for movement to an alternative location, and wherein one or more portions of the rails above the vehicle means of the transport network are missing in a direction transverse to a direction of the transport network forming one or more open grid spaces, thereby enabling alignment of the robotic load handling device above the vehicle means irrespective of whether the vehicle means is positioned beneath the one or more open grid spaces.

According to the invention there is provided a method of transferring a container between a first location and a second location in a robotic container storage, handling, and transfer system comprising moving a first vehicle means including a container in to a first location under a grid structure, moving a load handling device to a first position on the grid structure, the first position being located above the first location, lifting, by a lifting means of the load handling device, the container from the first vehicle means in to the body of the load handling device, moving the load handling device to a second position on the grid structure, the second position located above a second location beneath the grid structure, and depositing the container in to the second location.

BRIEF DESCRIPTION OF THE DRAWINGS

The invention will now be described with reference to the accompanying diagrammatic drawings in which

FIG. 3 is a schematic perspective view of one form of known prior art shipping container storage system, the robotic load handlers being sized so as to handle shipping containers and the like;

DETAILED DESCRIPTION

Figure 1:
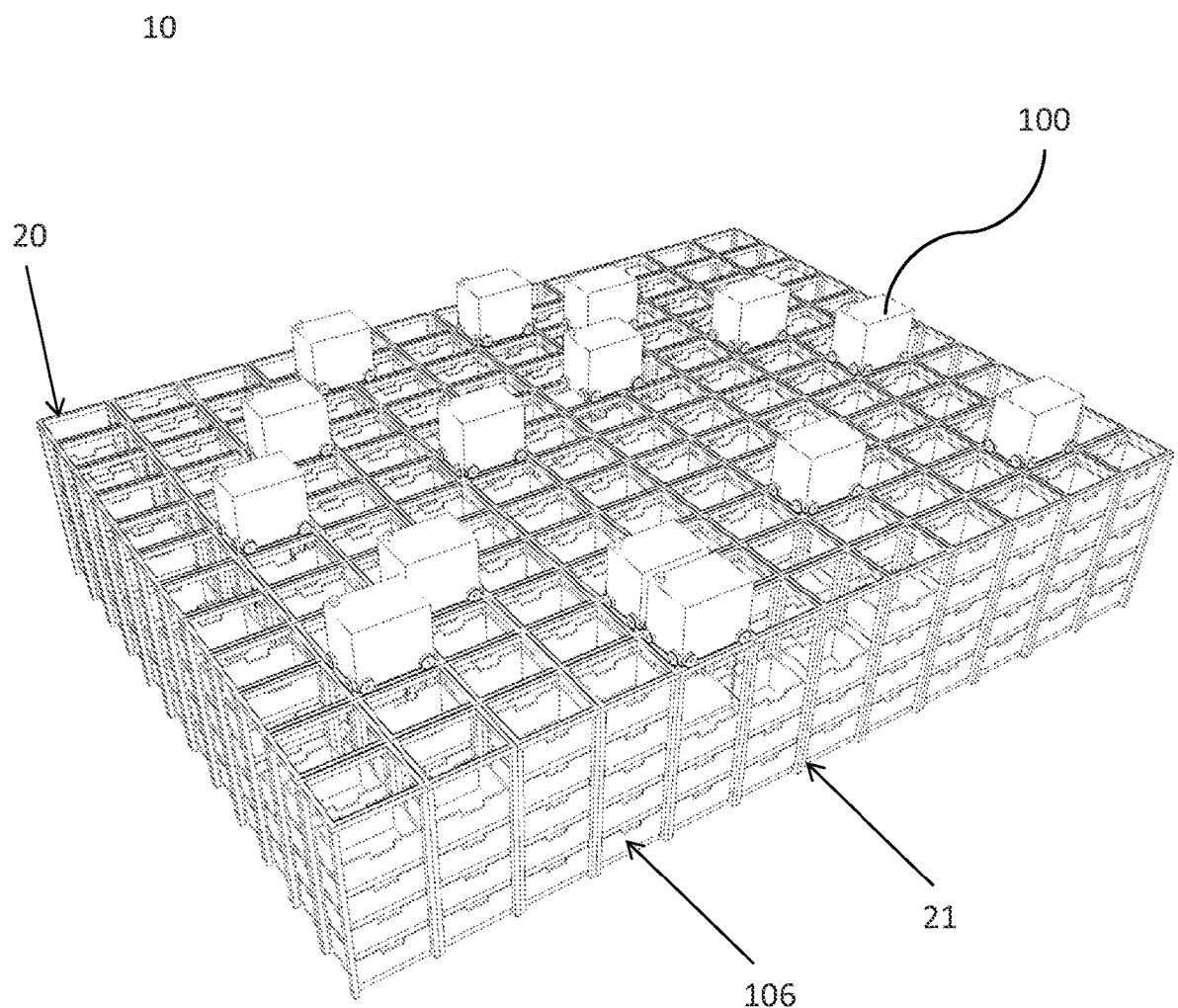
FIG. 1 is a schematic perspective view of one form of known prior art system for handling storage containers inside a warehouse setting, the system comprising robotic load handlers in operation above stacks of the storage containers, the load handlers moving the containers between stacks and to and from work stations.

The term semi-trailer is used to denote a trailer without a front axle. A large proportion of a semi-trailer's weight is supported by a tractor or motor unit, a detachable front axle assembly known as a dolly, or the tail of another trailer.

A semi-trailer is normally equipped with legs which can be lowered at the front to support it when it is uncoupled. Many semi-trailers have wheels that are capable of being totally dismounted and are also repositionable to better distribute load. Semi-trailers are more popular for road haulage than full trailers, which have both front and rear axles, mainly because a semi-trailer can be more easily swapped between two different tractor units as required, although ease of maneuvering is cited as one of the semi-trailer's chief advantages. A road tractor coupled to a semi-trailer is often called a semi-trailer truck or "semi" in North America & Australia, and an articulated lorry or "artic" in the UK, New Zealand & Australia. For the avoidance of doubt, in the present application, the term semi-trailer will be used to denote this form of trailer, irrespective of local terminology used.

It will be appreciated from the foregoing that shipping containers are moved as simple boxes, whereas semi-trailers comprise rear axles and wheels.

The use of such semi-trailers and shipping containers in transportation of goods, both domestically and internationally, has revolutionised international trade over the last decades.

For moving goods significant distances it would be advantageous to move shipping containers and semi-trailers via the rail network on railroad cars. The ability to move all such containers via rail networks over long distances to suitably positioned unloading areas for loading on to suitable road haulage equipment for onward transportation to required destinations would be extremely advantageous. However, moving semi-trailers and shipping containers between different forms of transport is an issue.

It is a disadvantage of road-rail intermodal transport that loading and off-loading containers and semi-trailers on railroad cars is time consuming and uses expensive equipment which is often poorly utilised. Typically large gantry cranes are used in marshalling yards. The large cranes straddle both the tracks and a marshalling yard for road vehicles. These cranes are large, expensive and yet have relatively low capacity. The high cost of such cranes results in only a small number being used, typically only one to four, at a given yard. This means it can take several hours to unload and load a train.

A second disadvantage of a typical known system is that once the railroad cars are loaded, it is very difficult to for a given container to change from one train to another. Traditionally, this was done at switchyards, where rail cars were moved individually between tracks to re-assemble new trains. This process is slow, laborious and expensive and has been in decline for many years, in spite of efforts by rail operators around the world to automate the process.

As a result of these issues, road-rail intermodal transport is mainly used in point to point relations over long distances, typically 1,000 km or more. As a result, there are typically significant road distances to and from the railheads and there are many instances where road-rail intermodal traffic is not feasible. Therefore, this can result in severe congestion on road networks in highly populated regions with resulting low productivity and widespread pollution.

The present inventions seeks to overcome these disadvantages and make road-rail intermodal transport feasible in many to many relations and also over shorter distances, potentially as short as 250 km or less.

FIG. 1 shows elements of one form of a known system 10 for picking inventory items from storage containers or bins 106 in a warehouse. Containers 106 are stacked on top of each other under a grid structure 20, supported by uprights 21, the grid and the uprights forming a framework in which the stacks of containers are located. The grid structure 20 comprises rails on which robotic load handlers 100 are operable. The robotic load handlers 100 are remotely controlled by a computer utility and radio communications means (not shown). Each robotic load handler 100 is operable to pick up a container using suitable lifting means located within the body of the load handler 100. Once a load handler 100 picks up a container 106, the load handler 100 moves under the control of the computer utility to the required location where the container 106 may be deposited. It will be appreciated that the lifted container 106 may be deposited on to an alternative stack or may be transported to an output port of the storage system and deposited accordingly to allow the inventory items stored therein to be accessed.

Figure 2:
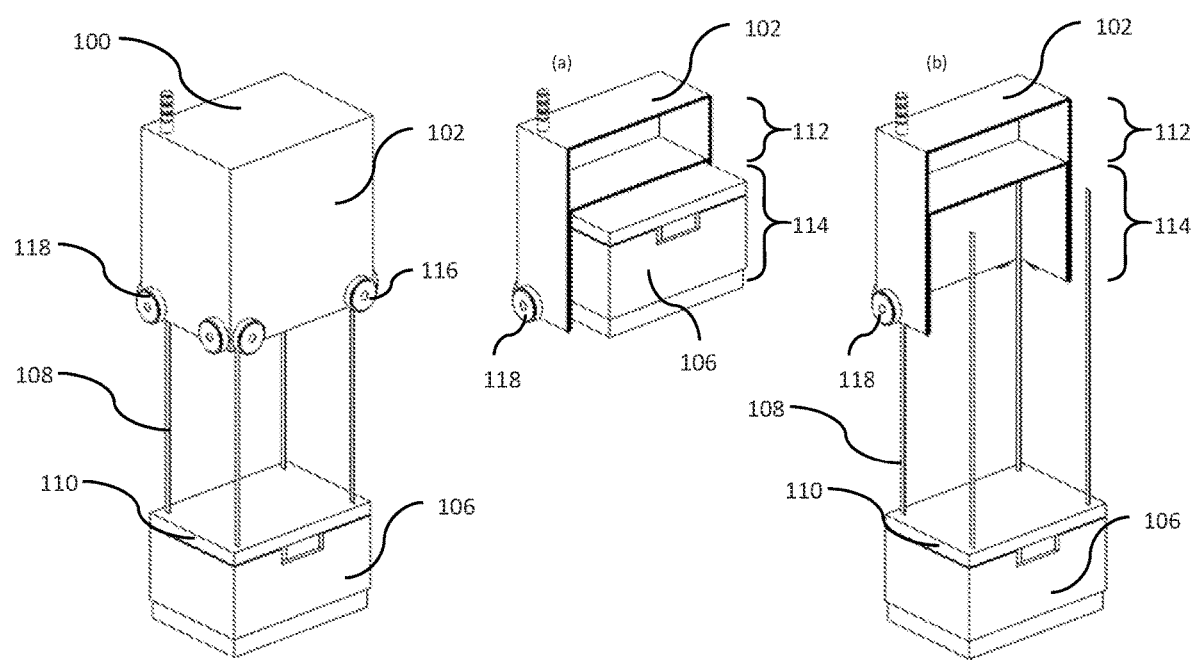
FIG. 2 is a schematic perspective view of one form of known prior art robotic load handler operable in the storage system of FIG. 1.

FIG. 2 shows one form of load handler 100 that may be used in the manner described with reference to FIG. 1. The robotic load handler 100 comprises: a body 102, with a cavity 114 in to which a container 106 may be lifted and hence transported; a space 112 for machinery, battery and electronics; and a gripper device 110 held by lines 108 the gripper means 110 comprising means for engaging a container 106. The load handler 100 further comprises two sets of rolling means 116, 118.

The rolling means 116, 118 may comprise two sets of four wheels. The load handler further comprises a mechanism (not shown) for raising and lowering each set of wheels 116, 118 independently of each other but relative to the body 102 of the load handler 100. When the first set of wheels engages the track on the grid the load handler 100 will travel in a first direction and when the second set of wheels engages the track the load handler 100 will travel in a second direction, substantially perpendicular to the first direction. In this way, the robotic load handler 100 may be moved to a predetermined desired location above a stack of containers 106 and, under the control of a suitable computer utility, lift up a container 106.

It will be appreciated that in the storage system described with reference to FIGS. 1 and 2, the load handlers 100 and containers 106 are of an appropriate size for use in a warehousing and online retailing environment.

Figure 3:
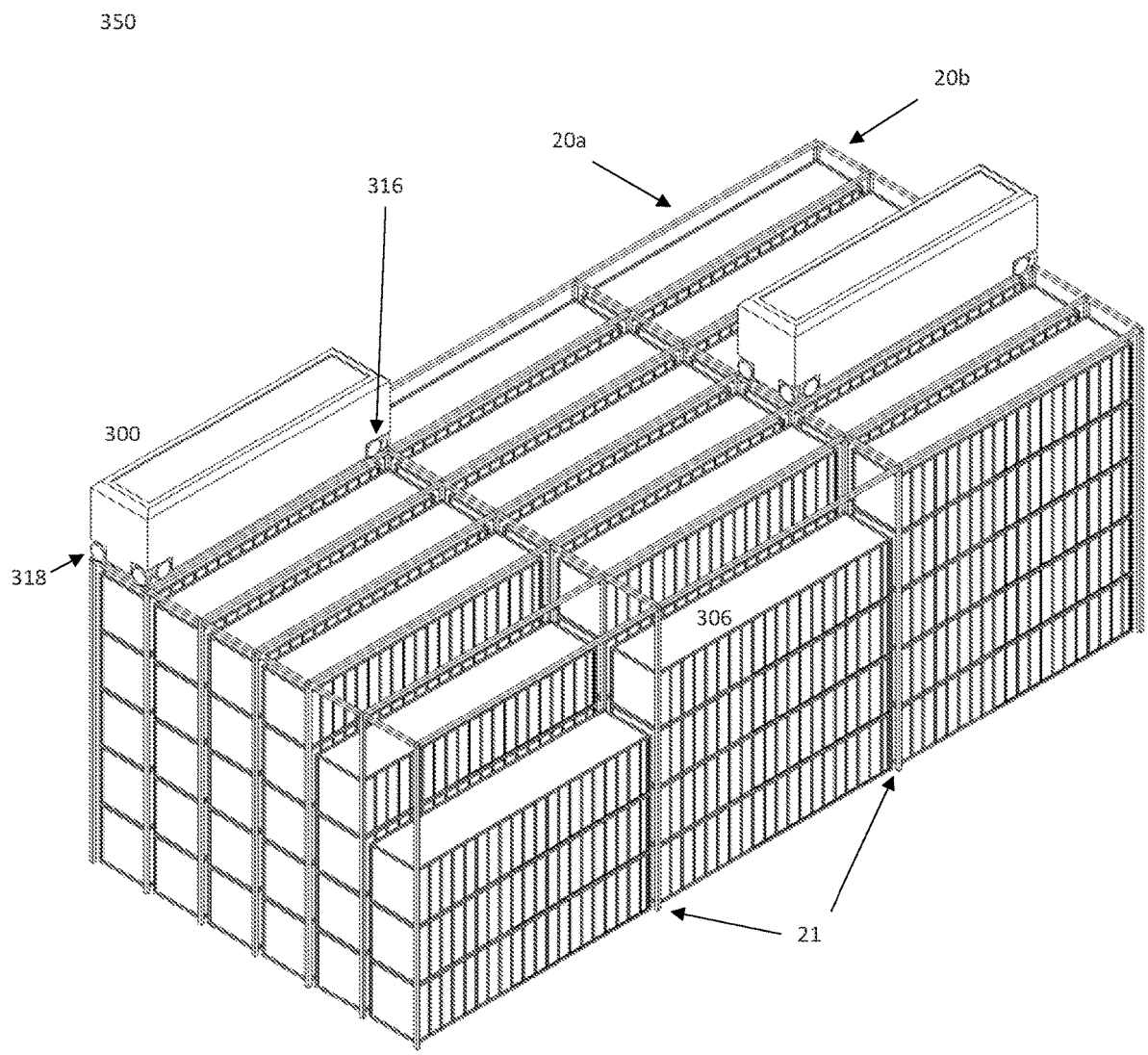

However, FIG. 3 shows a system operable in a similar manner to that described above with reference to FIGS. 1 and 2 however the containers 306 are shipping containers and the robotic load handlers 300 are of a size and nature to enable the containers 306 to be lifted from a stack of containers 306 and transported to the desired predetermined location.

FIG. 3 shows elements of a known system 350 for handling containers in a port. Here a robotic load handler 300, comprising substantially the same elements as the robotic load handler 100 in FIG. 2, is designed to be able to handle shipping containers 306 up to 40' or 45' in length. Typically the load handler 300 may also handle a pair of 20' shipping containers. The robotic load handler 300 has two sets of wheels 316, 318 to enable travel in either direction on the perpendicular grid 20a, 20b, which is supported by uprights 21, in a similar manner to that described above.

Figure 4:
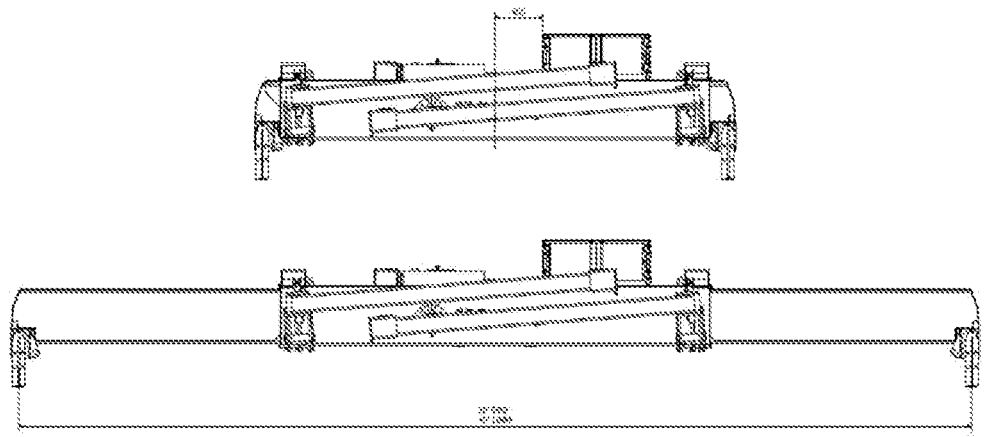
FIG. 4 is a schematic view of one form of known prior art gripper, or "spreader" capable of handling semi-trailers and shipping containers of different sizes.
Figure 4:
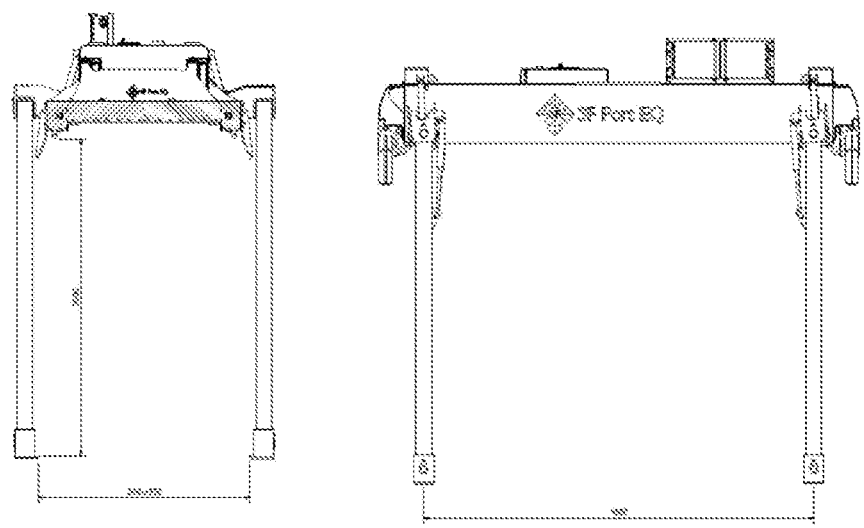

FIG. 4 shows a commercially available gripper device 404 fulfilling the same fundamental purpose as the gripper device 110 in FIG. 2. This gripper device (or spreader) 404 of FIG. 4, is able to handle both shipping containers 306 from 20' to 45' in length and semi-trailers. It will be appreciated that there are other versions of this gripper device which can also handle pairs of 20' containers.

Figure 5:
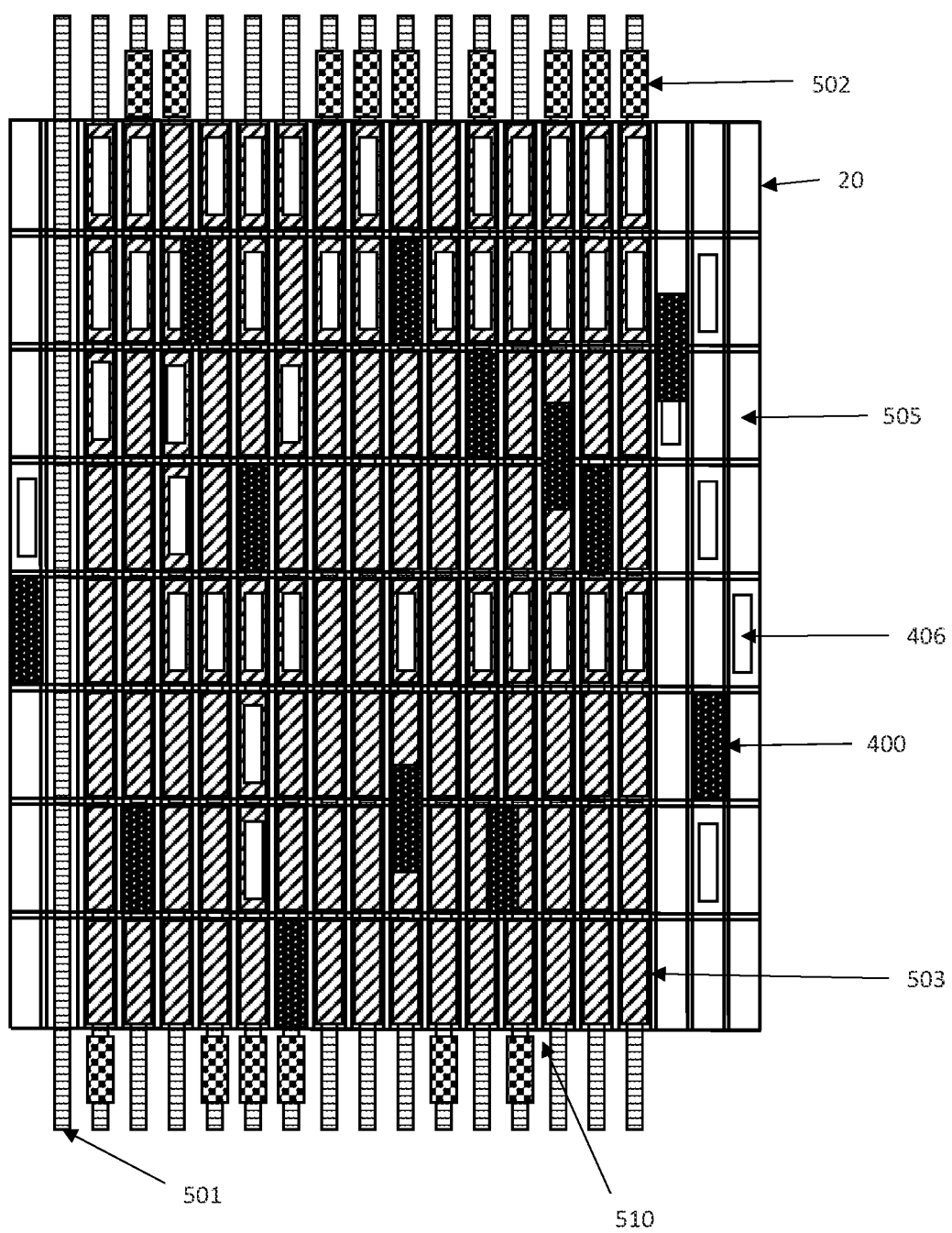
FIG. 5 is a schematic plan view of one form of cargo handling system in accordance with the invention showing a train-to-train interchange station, the interchange station comprising robotic load handlers moving containers and semi-trailers between railroad cars.

FIG. 5 schematically shows a top view of the proposed invention with a train interchange station 500 comprising a grid structure 20 over a number of rail tracks 501, on which a number of trains 510 are operable, each train 510 comprising a plurality of rail cars 503 and a locomotive 502. It will be appreciated that a locomotive 502 is only one way of driving a train and the locomotive may be replaced by motors on one or more of the rail cars 503 or any other suitable drive means. The rail cars 503 comprise means for carrying one or more shipping containers or semi-trailers 406, the shipping containers or semi-trailers comprising cargo or cargo carrying means. There is space for one or more shipping containers or semi-trailers 406, on a rail car 503.

For ease of explanation the term container 406 will be used to denote shipping container or semi-trailer. However, it will be appreciated that container may include any form of storage means suitable for transporting goods in the manner hereinbefore described. It will be appreciated that the containers may comprise refrigeration means or may comprise power supplies in order that goods requiring power or refrigeration may be shipped.

Figure 6:
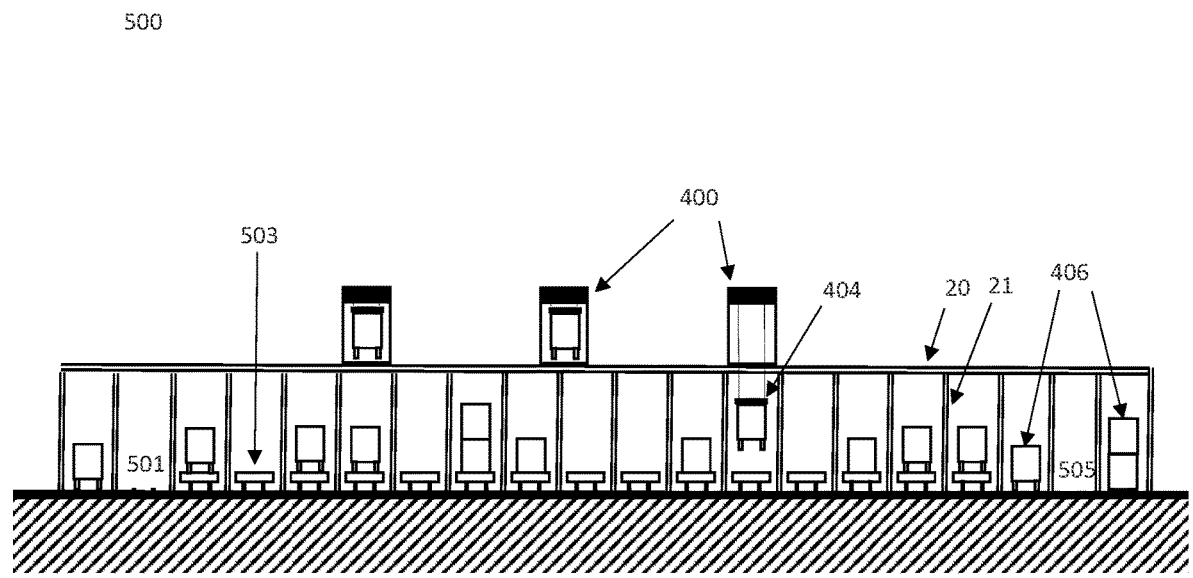
FIG. 6 is a schematic side view of the interchange system of FIG. 5 in accordance with one form of the invention.

As can be seen in FIG. 6, adjacent the tracks 501, yet beneath the grid 20, there are provided a number of storage locations 505 where containers 406 may be temporarily stored. As can further be seen with reference to FIG. 6, located on the grid 20, are a number of robotic load handlers 400 capable of moving container 406 between rail cars 503 and temporary storage locations 505.

In use, in accordance with one form of the invention, trains 510 are moved in to location under the grid 20. Load handlers 400 are moved in to position above a container 406 to be moved, hereinafter a target container 406. The gripper device 404, or other suitable container engaging means, is deployed from the load handler 400 and the target container 406 engaged and lifted by the robotic load handler 400. Once located within the cavity of the load handler 400, the load handler 400 is moved under the control of a suitable computer utility to a point on the grid 20 above which the target container 406 is required. The gripper 404 carrying the target container 406 is deployed to lower the container 406 on to the rail car 503 located beneath the framework.

It will be appreciated that wherever possible it is preferable to move containers 406 directly between rail cars 503. However, it will be appreciated that movement of containers 406 to and from temporary storage locations 505 may be used when required. For example should an outgoing train 510 be full or should a train destined for a desired location not be present then temporary storage positions may be used.

It will be appreciated that the robotic load handlers 400 may be powered by batteries, in which case charge stations (not shown) may be provided as required. Alternatively the load handlers 400 may comprise suitable power means, such as diesel generators or fuel cells on board.

It will be appreciated that a sufficient number of robotic load handlers 400 would be in operation to enable a rapid exchange of containers 406 such that the stationary time for each train 510 is short enough to meet the expectations of the cargo and container 406 owners.

The trains 510 in FIG. 5 comprise eight cars 503. However, it will be appreciated that any number of rail cars 503 may comprise a train. Indeed it is possible for a single train to comprise 50 or even 100 rail cars 503, depending on the circumstances. It is envisioned that the trains 510 would run on regular schedules and with relatively short intervals, much like passenger trains. In this way, the whole system 500 would be utilised many times per day, giving a high degree of capital and operational efficiency compared to previously known systems.

It is advantageous to have all rail cars 503 of the same length, length being matched to the pitch of the grid 20 and the size of the load handlers 400. However, it will be appreciated that this may not be necessary as it would be possible to move the train 510 on the track 501 in order to enable the loading and off-loading of cargo 406.

The grid 20 is shown here to have double track, meaning that adjacent spaces on the grid could both have a load handler present. This is advantageous in most applications with high throughput, but not strictly necessary. It will be appreciated that it is possible to operate a system 500, 550, 551 with single track in one or two of the dimensions.

Moreover, it will be appreciated that the tracks 501 need not be of the same gauge. It may be advantageous to use a system 500 to transfer containers 406 between rail cars 503 with different gauges, for instance at some national borders, or to make use of existing narrow gauge railroads which may otherwise be underutilised.

With reference to FIG. 6, a train interchange station 500 in accordance with one form of the invention is shown, the interchange comprising a grid structure 20 supported by uprights 21 forming a framework over a number of rail tracks 501. The grid structure 20 comprises a series of tracks on which load handlers are operable. In the example below and with reference to FIG. 6, three load handers 400 are shown in location on the tracks of the grid 20 above the rail tracks, one in the process of hoisting a container 406 using a spreader 404. As previously discussed, containers 406 may also be stored on top of each other in temporary storage locations 505 and in some countries if appropriate, also on rail cars 503 as is shown in FIG. 6.

Figure 7:
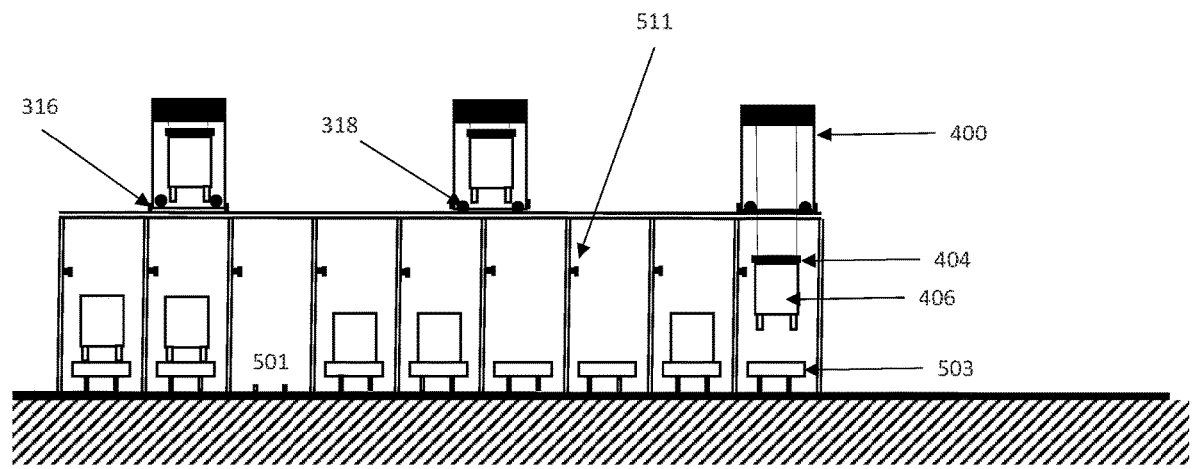
FIG. 7 is a schematic enlarged view of the interchange system of FIGS. 5 and 6 in accordance with one form of the invention.

FIG. 7 shows a side view of a smaller train interchange station 500 in accordance with a further form of the invention. As shown in more detail, the sets of wheels 316, 318 can be raised and lowered relative the body of the load handler 400 to enable travel in different directions. As described above with reference to the storage system, when one set of wheels are engaged with the tracks of the grid 20 the load handler 400 may travel in a first direction. When the second set of wheels are engaged with the tracks of the grid 20 the load handler 400 may travel in a second direction, in which the first direction of travel is substantially perpendicular to the second direction of travel. Also shown is a schematic representation of a power cable 511 for the locomotive 502, mounted on uprights 21, which may replace the conventional overhead power cable that could not be used under the grid 20 since it would prevent the lifting of containers 406.

Figure 8:
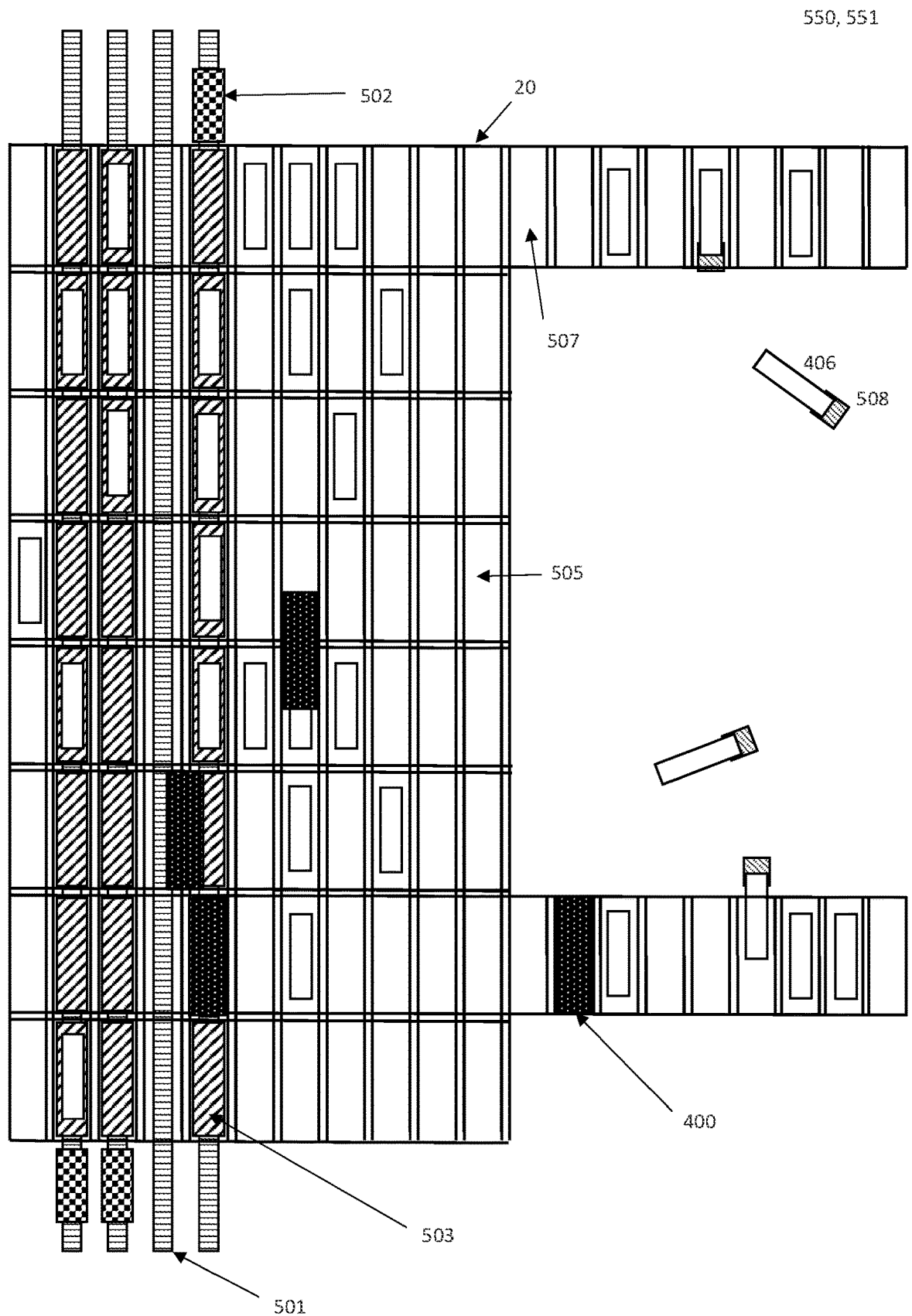
FIG. 8 is a schematic plan view of an alternative form of interchange in accordance with the invention, the interchange comprising an interface between road and rail networks, the interchange comprising loading stations for transferring containers between road and rail networks, and between different trains within the rail network and between different vehicles operable on the road network.

FIG. 8 shows a plan view of one form of road-rail interchange system in accordance with another form of the invention. The system comprises a rail interchange in conjunction with a road interchange 550, the system further comprising a grid structure 20 disposed over a number of rail tracks 501, on which a plurality of trains 510 are operable, each train comprising a number of rail cars 503 and a locomotive 502.

The system also comprises a number of temporary storage locations 505 and road interface spaces 507 where road vehicles 508 can deposit and collect containers 406. It will be appreciated that if equipped with sufficient number of tracks 501 and load handlers 400, the road interface station 550 can also be used as a road interface-rail interchange station 551.

In a similar manner described above with reference to the rail interchange system, load handlers 400 operate on the tracks of the grid above the trains and or road haulage vehicles. A load handler 400 may collect a container 406 from a train and deposit said container on a road vehicle or vice versa. Furthermore, it will be appreciated that the system may be provided with an area beneath the grid where road vehicles may be located to enable load handlers 400 to move containers 406 between two road vehicles.

It will be appreciated that using the system and method described above it is possible to reserve space on different trains or road vehicles on a journey from a first destination to a second destination, much like seat reservations on a passenger train journey. For example if a container needs to be moved from location A to location B and there is an available space for the given size container on that train then a reservation may be made to use the given space on the given train between the required destinations. Furthermore, it may be possible to book such a reservation using appropriate computer utilities either via a dedicated application or over a suitable internet connection. At the allotted time, the container owner delivers the container to the interchange a location A and the appropriate load handler lifts the container and deposits it in the allocated space on the train, for example.

It is possible using the system above to optimise the movement of containers, and hence the goods and items contained therein, and load handlers, once the exact arrival times of different trains, destinations of trains and reservations for the different containers is known.

Such optimisation may comprise rescheduling containers to different trains in the event of delays or changes in circumstances of the train or the containers. Furthermore, such optimisation provides the ability to prioritise the order of containers being delivered to their desired locations. Furthermore, it is possible to allocate priorities to the containers according to any number of variables such as, but not limited to price paid for shipping, container content, distance to destination, weight of container, availability of space on the train, and any other material factor to the shipping of containers.

It will also be appreciated that in the case of semi-trailers, it is possible to transport associated tractor units 508. Furthermore, other vehicles may be moved via the train, such as passenger vehicles, potentially two in the space of one trailer. Moreover, rigid lorries may be transported in a similar manner. In this way, advantageously, a container owner may be able to ship their entire vehicle rather than just the trailer if so desired. In this way, a given driver may accompany a given vehicle over long distances without utilising driving hours.

Figure 9:
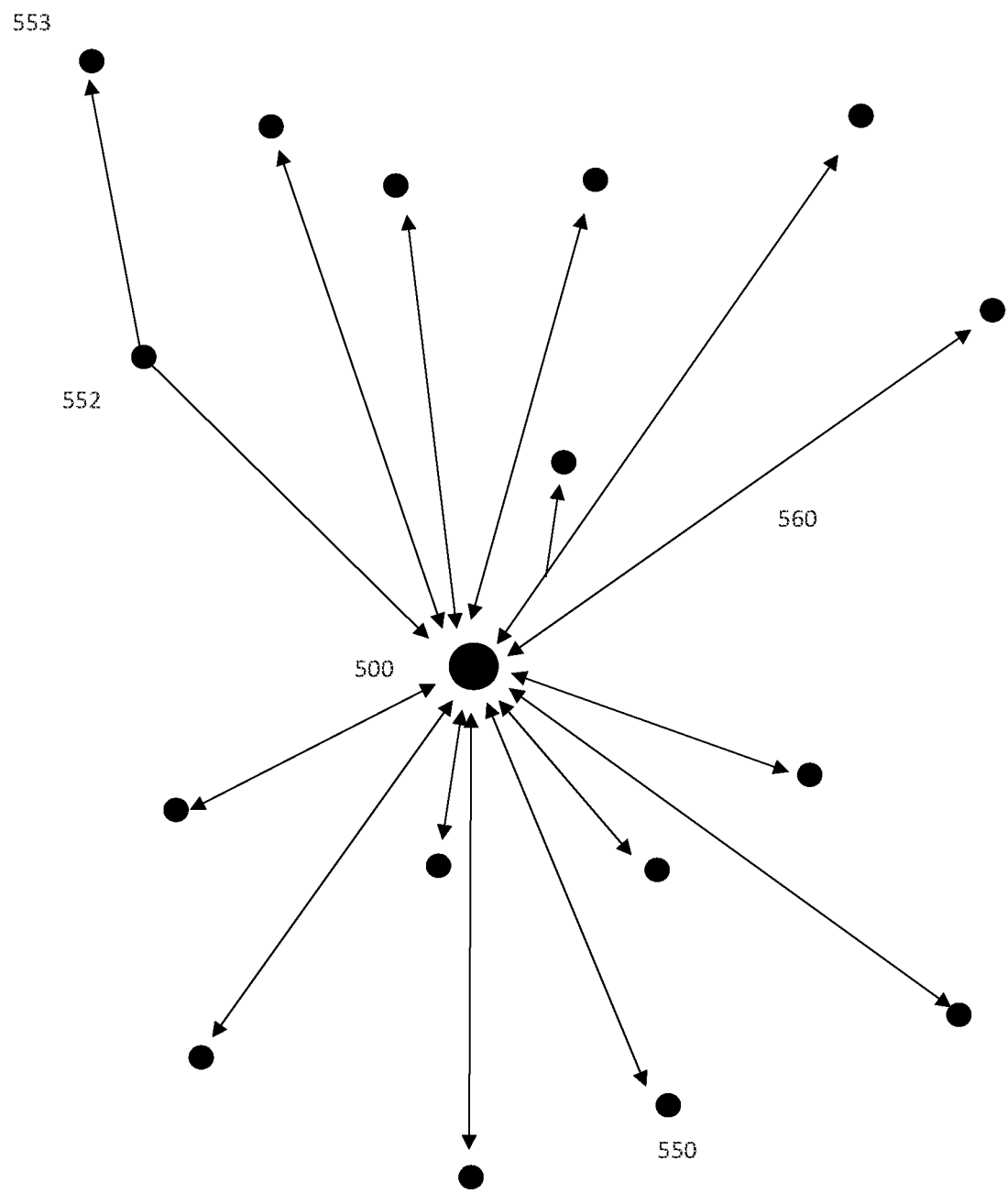
FIG. 9 is a schematic view of one form of network, the network comprising one train interchange station and sixteen road interface stations.

FIG. 9 shows a network in accordance with one form of the invention, the network comprising one train interchange 500 and sixteen road interfaces 550, 552. This network provides anywhere to anywhere connections between the sixteen road interface stations 550, 552, 553 with just one transfer and fifteen train relations 560. In some cases it may be advantageous that at intermediate station 552, a portion of the train 510 is decoupled and some cars 503 stay at station 552 while the rest carry on to end station 553. It will be appreciated that any of these interchanges may be provided with an interchange system as described with reference to FIGS. 5 to 10.

Figure 10:
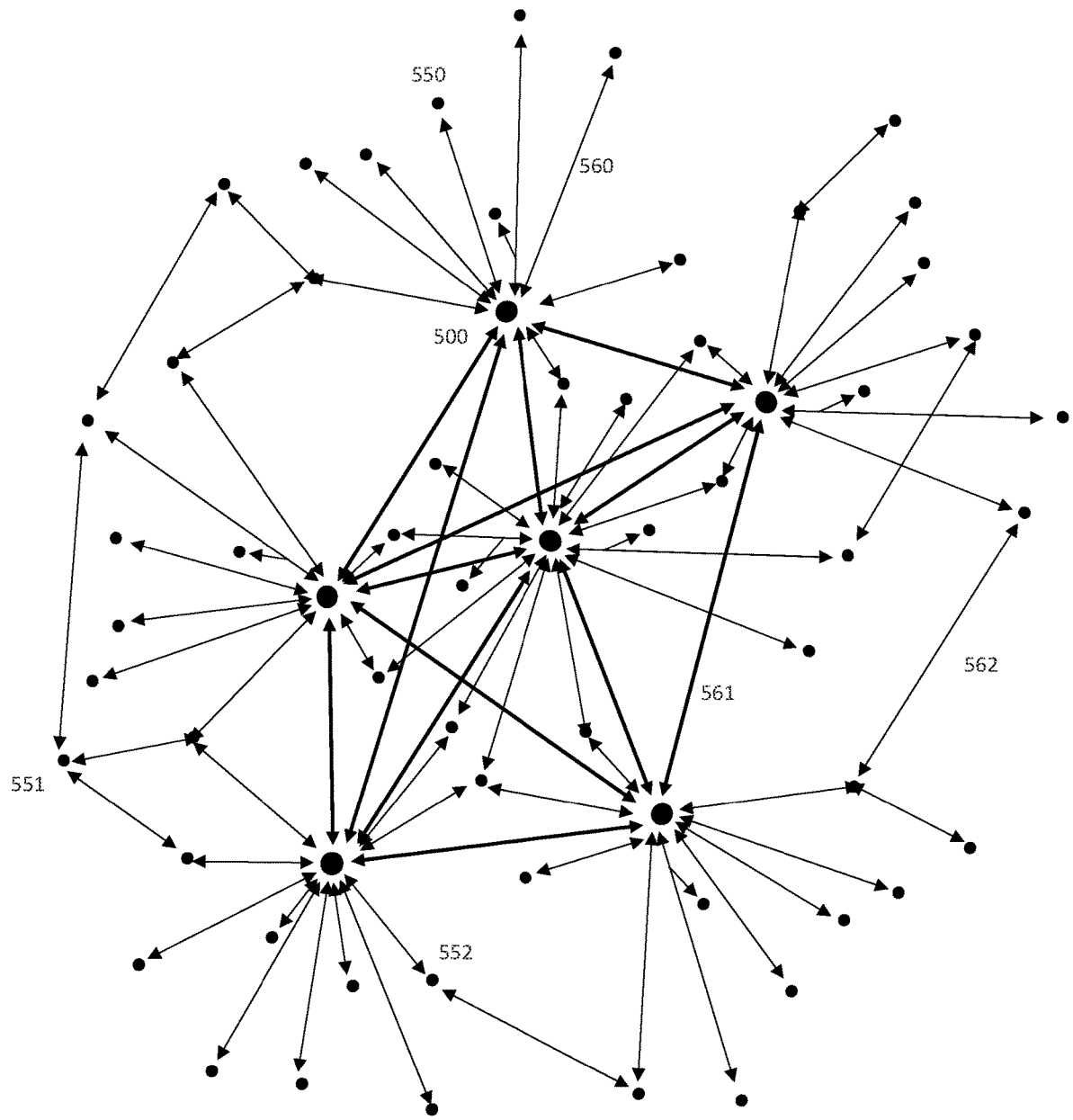
FIG. 10 is a schematic view of one form of network, the network comprising six train exchange stations and fifty-six road interface stations, seventeen of which also have some exchange capability.

FIG. 10 shows a network in accordance with a further form of the invention, the network comprising six train interchanges 500 and fifty-six road interchanges 550, 551, 552, seventeen of which also have some exchange capability 551. Rail links 560 are provided between the interchange stations and road interface stations 550, 551, 552. There are also links 561 between the interchange stations 500, which may be of high frequency and high capacity. There may be links 562 between road exchanges 550, 551, 552. Road exchanges 550, 551, 552 may be of the type described here, but can also be of any other type where containers 406 can be loaded on trains 510.

Figure 11:
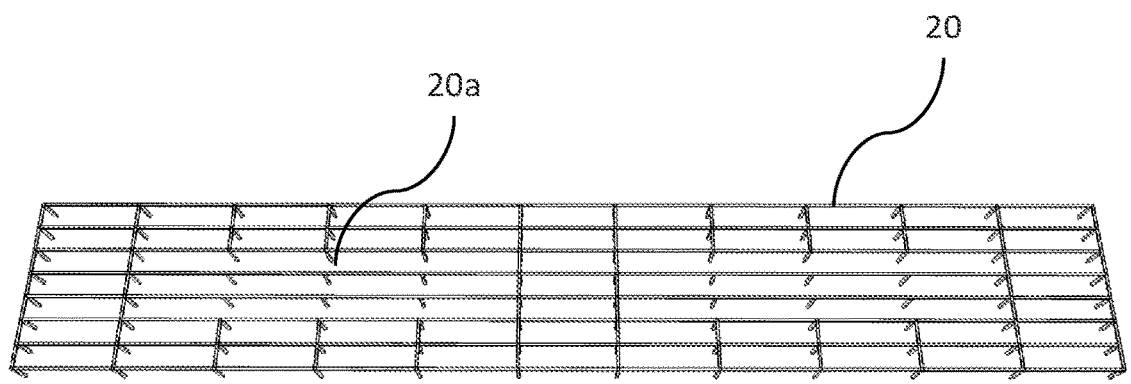
FIG. 11 is a schematic perspective view a further form of the invention showing a portion of the interchange, the interchange comprising tracks on which robotic load handlers operate, the tracks forming a grid above the network of transport links, portions of the tracks missing from the grid in order to allow for alignment of the load handlers above transporting vehicles operable on the networks.

FIG. 11 shows a further embodiment of the invention in which the grid 20 positioned above the or each transport networks comprises a grid formed of two sets of perpendicular tracks or rails 20a 20b wherein certain lengths of track in one direction 20a are missing. As can be seen in FIG. 11 this results in a grid system having a long length of track 20b in one direction with crossover points formed from lengths of track 20a in the substantially perpendicular direction.

The purpose of forming the grid 20 with missing sections of rail or track in one direction is to assist in alignment of the load handling devices 400 above cars of the transport vehicles operable on the transport network beneath the grid 20.

Figure 12:
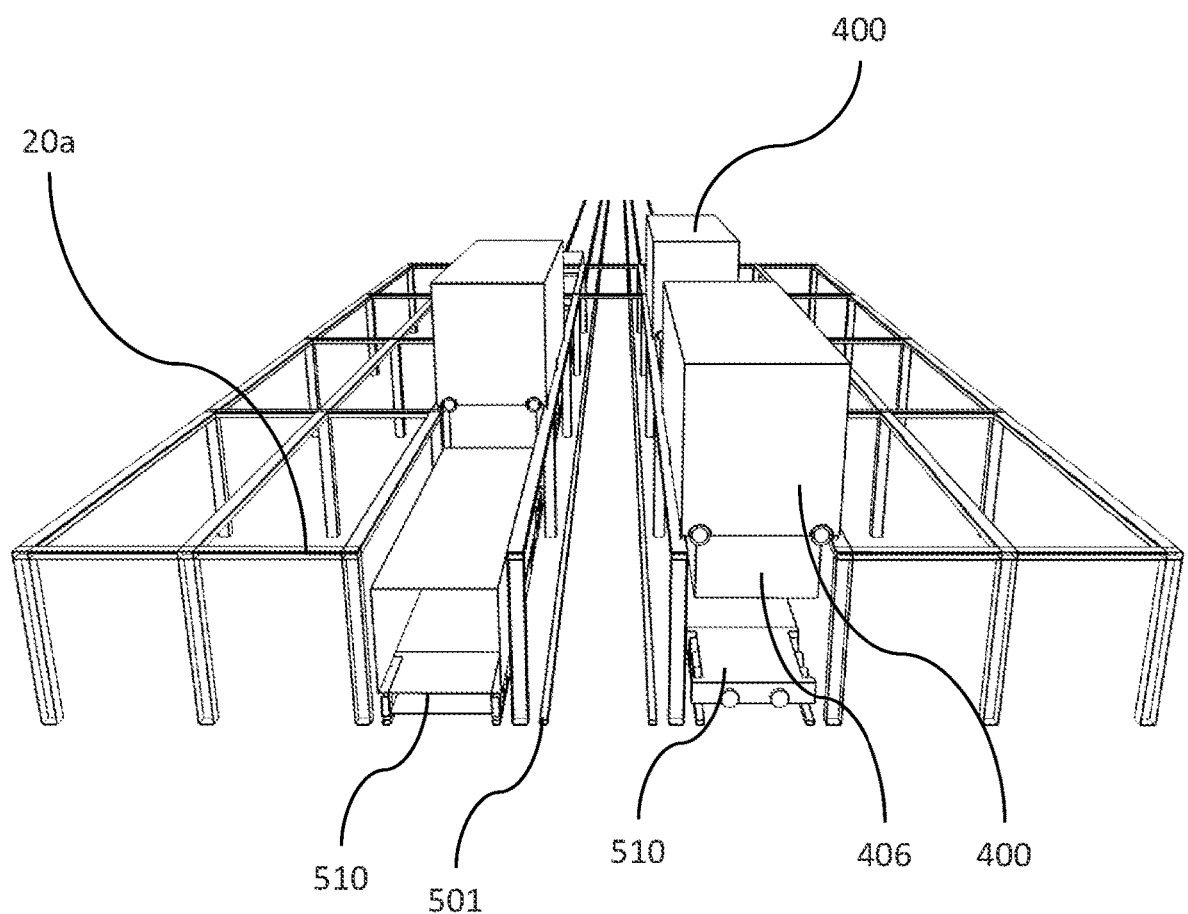
FIG. 12 is a schematic perspective view of the grid of FIG. 12 with load handling devices operable thereon, the load handling devices being located above vehicles of the transport networks and lowering containers from the load handling devices on to said vehicles.

As can be seen in FIG. 12, load handling devices 400 on tracks 20b above the vehicles 510 can move up and down the tracks 20b in a direction substantially parallel to the vehicle 510 beneath, the absence of the sections of track 20a in the substantially perpendicular direction enabling alignment of the load handling device 400 above the vehicle 510. In this way, the load handling device 400 can lower a container 406 on to the vehicle 510 in an unhindered manner, the positioning of the load handling device 400 being controlled accurately by a control system (not shown) but not being constrained by the position of the vehicle 510 beneath the tracks 20a 20b.

It will be appreciated that it is possible to align the vehicle 510 beneath the appropriate load handling device 400 in a similar manner, the vehicle 510 being shunted somewhat forwards or backwards as required until the required alignment is achieved.

Figure 13:
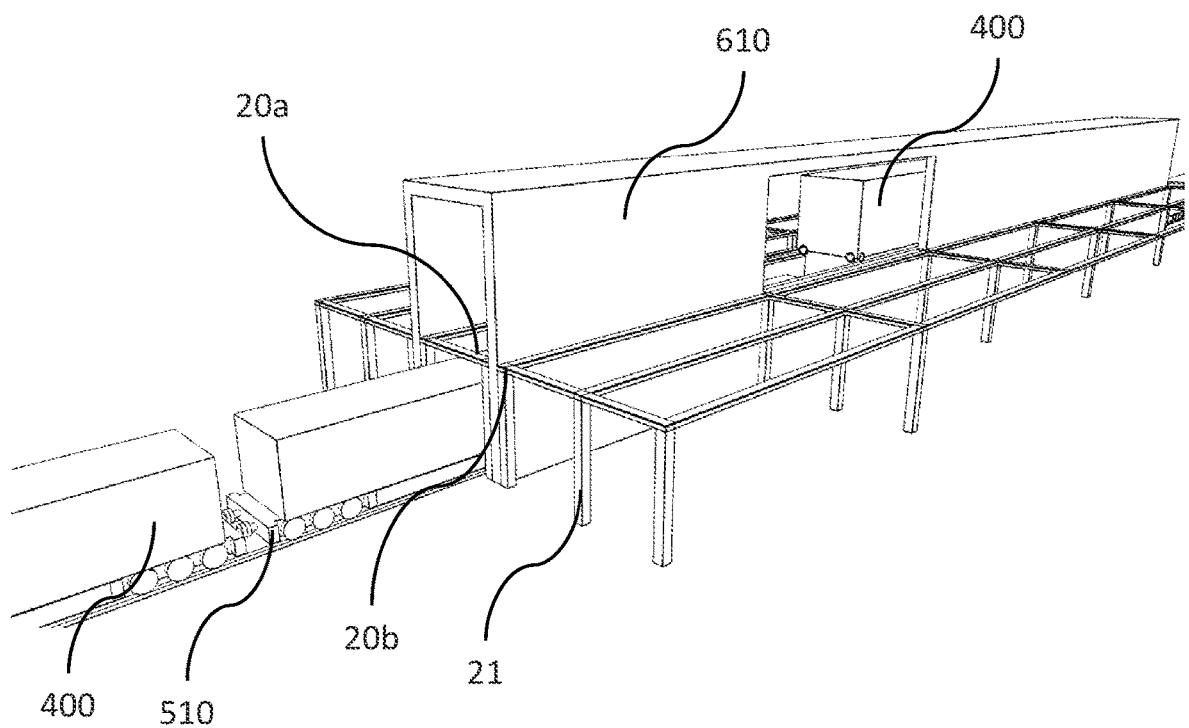
FIG. 13 is a schematic perspective view of a further form of the interchange in accordance with a further embodiment of the invention, the interchange further comprising protection means to prevent load handing devices from accessing areas of the interchange having missing portions of track.

FIG. 13 shows a further embodiment of the invention in which protection means 610 is provided on the grid 20 above the transport networks. In the embodiment described with reference to FIGS. 11 and 12, it will be appreciated that the grid 20 now comprises tracks 20a, 20b with missing sections. In order to prevent any load handling device 400 from being able to attempt to cross a section with missing tracks 20a, protection means 610 are positioned over the transport network and grid 20. Under normal operation the control means (not shown) controlling the load handling devices 400 would control the movement of the devices 400 such that it was not possible for the load handling device 400 to overshoot the relevant section of track 20a. However in the event of the malfunction of the control system or in the event that the inertia of the load handling device 400 causes an overshoot of the relevant grid space, the protection means 610 will prevent the load handling device from de-railing.

Figure 14:
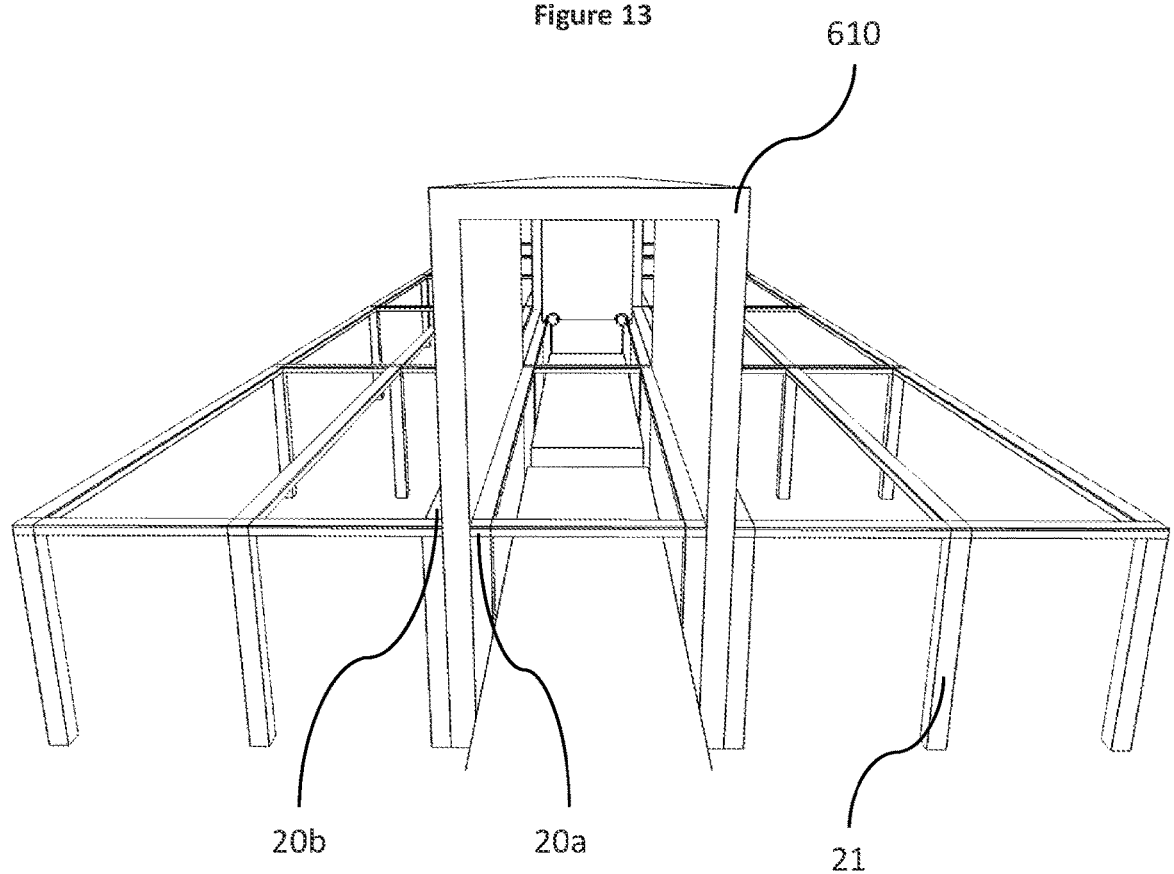
FIG. 14 is a schematic perspective view of the interchange of FIG. 14, showing transport vehicles operable on the transport network beneath the grid of the interchange system, the protection means additionally providing support for the interchange structure above the transport networks.

As can be seen in FIGS. 13 and 14, the protection means 610 comprises a tunnel-type structure having missing sections at the relevant crossover points where the grid comprises both sets of tracks 20a and 20b. Whilst the protection means 610 is shown in the Figures as a solid structure, it will be appreciated that it may be formed from a mesh structure or be formed by structural members at the corners and along the length of the structure with no sides. In this way the position of the load handling devices 400 on the tracks 20b can be visually monitored as required.

Advantageously, the protection means 610 may provide structural support for the grid 20 above the transport network. For example, the protection means 610 may form the uprights 21 of the framework. Furthermore, it will be appreciated that the protection means may act so as to support the tracks 20b. Additionally, it will be appreciated that the tracks 20b within the protection means need not be of a double track form as load handling devices will only need to pass along the tracks 20b and not pass other load handling devices 400. The protection means 610 will cause the grid spacing to be extended locally in the vicinity of the protection means as can be seen in FIG. 14. However, any tracks of the transport network may be sized and positioned according to the location of the protection means.

It will be appreciated that the container interchange system described does not require the containers to be located in stacks, rather the load handlers operate on a grid structure above vehicle means and move containers 406 between different vehicles or trains.

The invention claimed is:

1. A robotic container storage, handling, and transfer system
comprising:
a grid structure formed of two substantially perpendicular sets of rails above a portion of at least one transport network;
at least one vehicle means located on the portion of the at least one transport network beneath the grid structure, the vehicle means being configured for delivering one or more containers to the grid;
one or more of robotic load handling devices operating above and on the rails of the grid, the one or more robotic load handling devices including:
a body;
a first set of wheels mounted to the body, the first set of wheels being arranged to engage with at least two rails of the first set of rails, and
a second set of wheels mounted to the body, the second set of wheels being arranged to engage with at least two rails of the second set of rails, the first set of wheels being independently moveable and driveable with respect to the second set of wheels such that when in motion only one set of wheels is engaged with only one set of rails at any one time thereby enabling movement of the load handling device along the rails to any point on the grid by driving only the set of wheels engaged with the rails;
an engaging means configured for engaging at least one of the one or more containers; and
a lifting means configured for lifting the at least one of the one or more containers;
wherein the one or more robotic load handling devices are configured to lift the one or more containers from the vehicle means and transfer the one or more containers to an alternative location;
wherein a portion of the grid structure above the vehicle means of the at least one transport network has only one set of the rails such that the grid structure has missing sections; and
the grid structure includes:
a protection means having a structure positioned above the portions of the grid with missing rails, the protection means being configured so as to prevent the one or more load handling devices from derailing.

2. A robotic container storage, handling, and transfer system according to claim 1, wherein the protection means is a tunnel-type structure having missing sections where the first set of rails intersect the second set of rails.

3. A robotic container storage, handling, and transfer system according to claim 1, wherein the protection means is formed from at least one of: a mesh structure, and one or more structural members at corners along a length of the grid structure having no sides.

4. A robotic container storage, handling, and transfer system according to claim 1, wherein the protection means provides structural support to the grid structure.

5. A robotic container storage, handling, and transfer system according to claim 4, wherein the protection means forms upright structural members supporting the grid structure.

6. A robotic container storage, handling, and transfer system according to claim 1, wherein the second set of rails is a single rail track.

7. A robotic container storage, handling, and transfer system according to claim 1, wherein spacing of the grid structure is extended locally in a vicinity of the protection means.

8. A robotic container storage, handling, and transfer system according to claim 1, wherein the transport network has one or more tracks, the tracks being sized and positioned according to a location of the protection means.

9. A robotic container storage, handling, and transfer system according to claim 1, wherein the alternative location is a grid-based storage system for storing the one or more containers beneath the grid structure.

10. A robotic container storage, handling, and transfer system according to claim 9, wherein the grid-based storage system is located beneath one or more portions of the grid structure having two sets of rails.

11. A robotic container storage, handling and transfer system according to claim 1, wherein one or more of the one or more robotic load handling devices is configured to move the one or more containers directly between different vehicle means.

12. A robotic container storage, handling, and transfer system according to claim 1, wherein the vehicle means is at least one of: a train, a road vehicle, and a ship.

13. A robotic container storage, handling, and transfer system according to claim 1, wherein the portion of the transport network is a rail and road interchange system.

14. A robotic container storage, handling, and transfer system according to claim 1, comprising:
one or more containers which are at least one of the group consisting of: a semi-trailer, a shipping container, and a refrigerated container.

15. A network comprising one or more robotic container storage, handling, and transfer systems according to claim 1, wherein the transport system of a first robotic container storage, handling, and transfer system is a train interchange, and the transport system of a second robotic container storage, handling, and transfer system is a train and road interface.

16. A network according to claim 15, wherein the network includes one or more intermediate stations, the intermediate stations being storage locations for the one or more containers of the vehicle means.

17. A network according to claim 15, wherein the network includes one or more intermediate stations, the intermediate stations being transport system interchange stations.

18. A method for transferring a container between a first location and a second location in a robotic container storage, handling, and transfer system, the method comprising:
moving a first vehicle means including the container in to the first location under a grid structure, the grid structure formed of two substantially perpendicular sets of rails above a portion of at least one transport network;
moving a load handling device to a first position on the grid structure, the first position being located above the first location, the first position having only one set of rails such that the grid structure has a missing section at the first position and the grid structure having a protection means at the first position to prevent the robotic load handling device from derailing, the load handling device including:
a body;
a first set of wheels mounted to the body, the first set of wheels being arranged to engage with at least two rails of the first set of rails,
a second set of wheels mounted to the body, the second set of wheels being arranged to engage with at least two rails of the second set of rails, the first set of wheels being independently moveable and driveable with respect to the second set of wheels such that when in motion only one set of wheels is engaged with only one set of rails at any one time thereby enabling movement of the load handling device along the rails or tracks to any point on the grid by driving only the set of wheels engaged with the rails,
an engaging means configured for engaging at least one of the one or more containers, and
a lifting means configured for lifting the at least one of the one or more containers;
lifting, by the lifting means of the load handling device, the container from the first vehicle means in to the body of the load handling device;
moving the load handling device to a second position on the grid structure, the second position located above the second location beneath the grid structure; and
depositing the container in to the second location.

19. A method according to claim 18, wherein the second location is at least one of the group consisting of: a second vehicle means, and a storage location.

20. A robotic container storage, handling, and transfer system comprising:

a grid structure formed of two substantially perpendicular sets of rails above a portion of at least one transport network;

a robotic load handling device operating on the grid structure, wherein the robotic load handling device includes a first set of wheels arranged to engage with at least two rails of the first set of rails, and a second set of wheels arranged to engage with at least two rails of the second set of rails, such that only one set of wheels is engaged with the grid structure at any one time;

a vehicle means located on the at least one transport network below the grid structure, the vehicle means configured to receive a container, the robotic load handling device being provided with an engaging means for engaging the container when located on the vehicle means, and a lifting means configured for lifting the container from the vehicle means for movement to an alternative location; and wherein one or more portions of the rails above the vehicle means of the transport network are missing in a direction transverse to a direction of the transport network forming one or more open grid spaces, thereby enabling alignment of the robotic load handling device above the vehicle means irrespective of whether the vehicle means is positioned beneath the one or more open grid spaces.

* * * * *